(12) United States Patent  
Sako

(10) Patent No.: US 7,047,854 B2  
(45) Date of Patent: May 23, 2006

(54) POWER TOOLS

(75) Inventor: Masahiko Sako, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 11/220,929

(22) Filed: Sep. 7, 2005

(65) Prior Publication Data

US 2006/0000332 A1    Jan. 5, 2006

Related U.S. Application Data

(62) Division of application No. 10/706,514, filed on Nov. 12, 2003, now Pat. No. 6,959,631.

(30) Foreign Application Priority Data

Nov. 12, 2002   (JP) .............................. 2002-328837  
Mar. 24, 2003   (JP) ............................... 2003-81399

(51) Int. Cl.  
*B28D 5/20* (2006.01)

(52) U.S. Cl. ............................. 83/58; 83/76.1; 83/370; 83/477.2; 83/DIG. 1

(58) Field of Classification Search .................... 83/58, 83/62, 63, 72, 76.1, 76.6–76.9, 370, 477.2, 83/DIG. 1; 342/90, 109–112; 192/129 R, 192/125 R, 116.5; 318/362; 700/253, 255  
See application file for complete search history.

(56) References Cited

U.S. PATENT DOCUMENTS

RE23,403 E    9/1951 Barker (Continued)

FOREIGN PATENT DOCUMENTS

DE    19609771    6/1998

(Continued)

OTHER PUBLICATIONS

European Search Report; Mar. 10, 2004.

(Continued)

*Primary Examiner*—Stephen Choi  
(74) *Attorney, Agent, or Firm*—Orrick, Herrington & Sutcliffe LLP

(57) ABSTRACT

Power tool 1 may include table 5 on which work W is positioned. A portion of a circular blade 3 protrudes above table 5. Circular blade 3 may be driven by a motor. The motor may be controlled by a control device 90. Work W is cut by means of an operator sending work W positioned on an upper face of table 5 in the direction of the circular blade 3 while circular blade 3 is being driven by the motor. Power tool 1 may include first radar device 86 and second radar device 87 for monitoring a predetermined area in the vicinity of circular blade 3. First radar device 86 may detect whether objects other than work are present in the vicinity of a outer edge of circular blade 3. Second radar device 87 may detect the location of objects moving within the predetermined area in the vicinity of circular blade and detects the speed at which the objects are moving in the direction in which work is sent. Control device 90 may cause an emergency halt of the motor in the case where first radar device 86 detects that an object other than work is present in the vicinity of the outer edge of circular blade 3. Further, Control device 90 may cause an emergency halt of the motor in the case where an object detected by second radar device 87 has a predetermined positional relationship relative to circular blade 3 and the detected speed exceeds a predetermined value.

7 Claims, 14 Drawing Sheets

U.S. PATENT DOCUMENTS

| | | |
|---|---|---|
| 3,725,763 A | 4/1973 | Tokarz |
| 3,785,230 A | 1/1974 | Lokey |
| 4,075,961 A | 2/1978 | Harris |
| 4,345,167 A * | 8/1982 | Calvin .................. 327/517 |
| 4,653,189 A | 3/1987 | Andreasson |
| 5,081,406 A | 1/1992 | Hughes et al. |
| 5,214,388 A | 5/1993 | Vranish et al. |
| 5,345,138 A * | 9/1994 | Mukaidono et al. ........ 307/326 |
| 5,436,613 A | 7/1995 | Ghosh et al. |
| 5,670,886 A * | 9/1997 | Wolff et al. ............... 324/644 |
| 5,942,975 A * | 8/1999 | S.o slashed.rensen ....... 318/478 |
| 6,191,382 B1 | 2/2001 | Damikolas |
| 6,220,134 B1 | 4/2001 | Thiel et al. |
| 6,222,481 B1 * | 4/2001 | Abrahamson et al. ........ 342/90 |
| 6,376,939 B1 | 4/2002 | Suzuki et al. |
| 6,597,308 B1 | 7/2003 | Isaji |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0069734 A1 | 6/2002 | Gass et al. |
| 2003/0164792 A1 * | 9/2003 | Jahangir et al. ............... 342/90 |
| 2003/0209166 A1 | 11/2003 | Culpepper et al. |
| 2004/0226424 A1 * | 11/2004 | O'Banion et al. ............. 83/58 |

FOREIGN PATENT DOCUMENTS

| | | |
|---|---|---|
| EP | 1 061 487 A | 12/2000 |

OTHER PUBLICATIONS

U.S. Appl. No. 10/938,975; Masahiko Sako, Filed Sep. 10, 2004.

* cited by examiner

Operator Side

POWER TOOLS

CROSS REFERENCE

This application is a divisional of and claims priority to U.S. patent application Ser. No. 10/706,514, filed Nov. 12, 2003 now U.S. Pat. No. 6,959,631 and Japanese patent application number 2002-328837, filed Nov. 12, 2002, and Japanese patent application number 2003-81399, filed Mar. 24, 2003, each of which are incorporated herein by reference as if fully set forth herein.

BACKGROUND OF THE INVENTION

1. Field of the Invention

The present invention relates to power tools, e.g., table saws, miter saws and the like. Specifically, techniques are described for preventing a cutting tool from making contact with objects other than work.

2. Description of the Related Art

U.S. unexamined patent application no. 17336/2002 describes a power tool that carries out an emergency stop when a cutting tool has made contact with a person (i.e., an object other than work). The known power tool includes a contact detection system that detects contact between a person and a cutting tool. The contact detection system is electrically coupled to the cutting tool and monitors an electrical potential of the cutting tool in order to detect contact between a person and the cutting tool. If contact between the person and the cutting tool is detected by the contact detection system, power supply to the motor is stopped, effecting an emergency stop of the cutting tool.

SUMMARY OF THE INVENTION

However, in the known power tool, movement of the cutting tool is halted only after contact between a person and the cutting tool has been detected, and it is not possible to prevent contact between the person and the moving cutting tool.

It is, accordingly, one object of the present teachings to provide improved power tools that can prevent a cutting tool from making contact with objects other than work (e.g., persons, etc).

In one aspect of the present teachings, power tools are taught that are capable of detecting abnormal conditions before contact between the cutting tool and objects other than work occurs. Therefore, if the abnormal conditions are detected, the power tools can warn operators and/or stop movement of the cutting tool.

Thus, in one embodiment of the present teachings, power tools may include a cutting tool, such as a circular blade or saw blade, and a drive source, such as an electric motor, for driving the cutting tool. Such power tools may also include a detecting device (e.g., a detecting device using radio waves, a detecting device using ultrasonic waves, a detecting device using infrared rays, etc.) and a control device, such as a microprocessor or processor, in communication with the detecting device. For example, the detecting device may detect the location and speed of objects (e.g., work, etc.) moving within a predetermined area near the cutting tool. On the basis of the location and speed of the objects detected by the detecting device the control device may determine whether operating conditions are normal or abnormal. For example, the control device may determine whether the cutting tool and the objects detected by the detecting device have a predetermined positional relationship (e.g., whether the distance between the cutting tool and the object is within a predetermined value), and also determine whether the speed of the objects detected by the detecting device towards the cutting tool exceeds a predetermined value. From the results of these determinations it may be decided whether operating conditions are normal or abnormal. For example, when a detected object is moving at normal speed near the cutting tool and in a direction approaching the cutting tool, it may be determined that this is simply work being delivered for cutting at a normal speed and that operating condition is normal. However, when the detected object is moving at rapid speed near the cutting tool and in a direction approaching the cutting tool, it may be determined that operating conditions is abnormal. Since it can be determined whether operating conditions are normal or abnormal before contact between the object and the cutting tool occurs, contact between the object and the cutting tool can be prevented under abnormal operating conditions.

When operating conditions have been determined to be abnormal, a warning may be given to the power tool operator, and/or the movement of the cutting tool may be automatically stopped. For example, the power tools may also include a buzzer that generates a warning sound. Further, the power tool may also include a switch for cutting off power supply to the motor. As another example, the power tool may also include a brake mechanism that engages and stops the cutting tool, or retracting mechanism that retract the cutting tool from its operating position. Further, the power tool may also include a barrier that is placed between the cutting tool and the operator when operating conditions have been determined to be abnormal.

Preferably, the detecting device may include a radar device that transmits radio waves towards the predetermined area and receives the radio waves reflected therefrom. By using the radio waves, the location and speed of the object can be detected accurately even if chips are formed during the cutting operation.

Further, it is preferred that the frequency of the radio waves transmitted from the radar device is 1 GHz or above, and it is more preferred that the frequency is in the range of 10–30 GHz. By using radio waves of this frequency, directivity can be improved, and it is possible to monitor only the surroundings of the cutting tool.

In another embodiment of the present teachings, the power tools may further include a table on an upper face of which the work is positioned. A portion of the cutting tool may protrude above the table, this protruding portion cutting the work. In this case, the area to be monitored by the radar device may be restricted to above the table. For example, it is possible to monitor only an area that rises to a predetermined height above the table and is within a predetermined range of distance from side faces of the cutting tool. Further, it is preferred that the radar device is disposed in positions so as to sandwich the table and face towards a power tool operator. This type of configuration prevents the radar device from obstructing the operations of the power tool operator.

In another aspect of the present teachings, power tools may include a cutting tool and a motor for driving the cutting tool. The power tool may further include a radar device and a processor in communication with the radar device. The radar device preferably transmits radio waves towards a predetermined area in the vicinity of a contacting location where an edge of the cutting tool and work make contact, and receives radio waves reflected therefrom. The processor preferably determines from the reflected radio waves received by the radar device whether an object other than work is in the predetermined area. For example, using the difference between the waves reflected when work is in the predetermined area and the waves reflected when an object other than work is in the predetermined area, the processor can determine whether work or an object other than work is in the predetermined area. When it has been determined that an object other than work is in the predetermined area, a warning may be given to the power tool operator, and/or the movement of the cutting tool may be immediately stopped. By this means, contact between the cutting tool and an object other than work can be prevented.

Preferably, the power tools may also include a memory for storing the reflected radio waves created when the work is disposed within the predetermined area. The reflected waves can be stored as time series data in the memory. Alternatively, only identification information extracted from the reflected waves (e.g., peak values of the reflected waves, waveform patterns, etc.) may be stored. Further, the processor may determine whether an object other than work is in the predetermined area by using the reflected waves received by the radar device and the reflected waves stored in the memory. For example, the processor preferably determines that an object other than work is in the predetermined area when the absolute value of the difference between the peak values of the reflected waves received by the radar device and peak values of the reflected waves stored in the memory exceeds a predetermined threshold value. Since the reflected waves created when the work is disposed in the predetermined area are already stored, this configuration allows an accurate determination of whether an object other than work is in the predetermined area.

Generally, the radio wave reflection coefficient of materials varies according to frequency. As a result the radio waves may be transmitted from the radar device as impulses (i.e., including many frequency elements), and the processor may perform frequency analysis on the reflected waveforms to determine whether an object other than work is present within the predetermined area.

In the alternative, in the case where the work is wood, the radio wave reflection coefficient characteristics of wood can be taken into account and only radio waves within a narrow frequency range can be transmitted (e.g., single frequency radio waves) to allow the determination of whether an object other than work is present within the predetermined area. For example, the frequency of the radio waves transmitted from the radar device may be established between the range of 1–30 GHz. Radio waves with a frequency of 1–30 GHz have a low reflection coefficient for wooden material that has a low moisture content, and have a high reflection coefficient for objects with a high moisture content (e.g., hands, fingers, etc.). Consequently, it is possible to identify whether the object from which the radio waves are reflected is work or an object other than work (i.e., an object with a high moisture content) even though radio waves within a narrow frequency range are transmitted. That is, when the peak values of the reflected waves received by the radar device exceed a predetermined threshold, it can be determined that an object other than work is present in the predetermined area. Further, even in the case where the frequency of the radio waves is within the range of 1~30 GHz, the frequency may be changed in accordance with one's aims. For example, it is preferred that a lower radio-wave frequency is chosen for penetrating bulky wood, and that a higher radio-wave frequency is chosen for improving the directivity of the radio waves.

In another embodiment of the present teachings, the power tools may further include a table on an upper face of which the work is positioned. A portion of the cutting tool may protrude above the table, this protruding portion cutting the work. In this case, it is preferred that the radar device may be disposed beneath the table and that the table may have a penetrable window which can allow the radio waves transmitted from the radar to penetrate therethrough. The penetrable window can be manufactured from a material (e.g., resin) through which radio waves penetrate easily. Locating the radar device beneath the table prevents the radar device from obstructing the operator.

In another embodiment of the present teachings, the power tools may include a table on an upper face of which work is positioned, and an arm slidably or pivotably attached to the table. A cutting area for cutting the work may be provided on the table. The cutting tool may be rotatably attached to the arm. By moving the arm relative to the table, the cutting tool can be moved between an operating position close to the cutting area and a waiting position removed therefrom. In this case, it is preferred that the radar device transmits the radio waves towards the cutting area and receives the radio waves reflected therefrom.

In another aspect of the present teachings, the radar device may include a radio wave transmitting member and a radio wave receiving member. Preferably, at least one of the radio wave transmitting member and the radio wave receiving member may have a plurality of microstrip antennas. By using the microstrip antennas, the radio wave transmitting member or the radio wave receiving member can be miniaturized and can save space. Further, by using a plurality of microstrip antennas or patch antennas (i.e., a type of microstrip antenna), the desired directivity can be obtained. Further, the radio wave transmitting member and the radio wave receiving member may have different antennas. Alternatively, the radio wave transmitting member and the radio wave receiving member may have the same antenna.

Preferably, the microstrip antenna may include a strip conductor, a ground conductor disposed in a position opposite the strip conductor, and a dielectric layer disposed between the strip conductor and the ground conductor. In this case, a groove may be formed in a surface of the dielectric layer and that the strip conductor may be disposed within the groove. Since the strip conductor does not protrude from the surface of the dielectric layer, damage to the strip conductor can be prevented. Further, a groove may be formed in the ground conductor and that the dielectric layer may disposed within the groove formed in the ground conductor. By this means, the dielectric layer does not protrude from the ground conductor, and consequently damage to the dielectric layer can be prevented. Preferably, the microstrip antenna may be disposed within a surface of a housing of the power tools (e.g., a table, etc.).

These aspects and features may be utilized singularly or, in combination, in order to make improved power tools, including but not limited to, table saws, miter saws. In addition, other objects, features and advantages of the present teachings will be readily understood after reading the following detailed description together with the accompanying drawings and claims. Of course, the additional features and aspects disclosed herein also may be utilized singularly or, in combination with the above-described aspect and features.

DETAILED DESCRIPTION OF THE INVENTION

First Detailed Representative Embodiment

Figure 1:
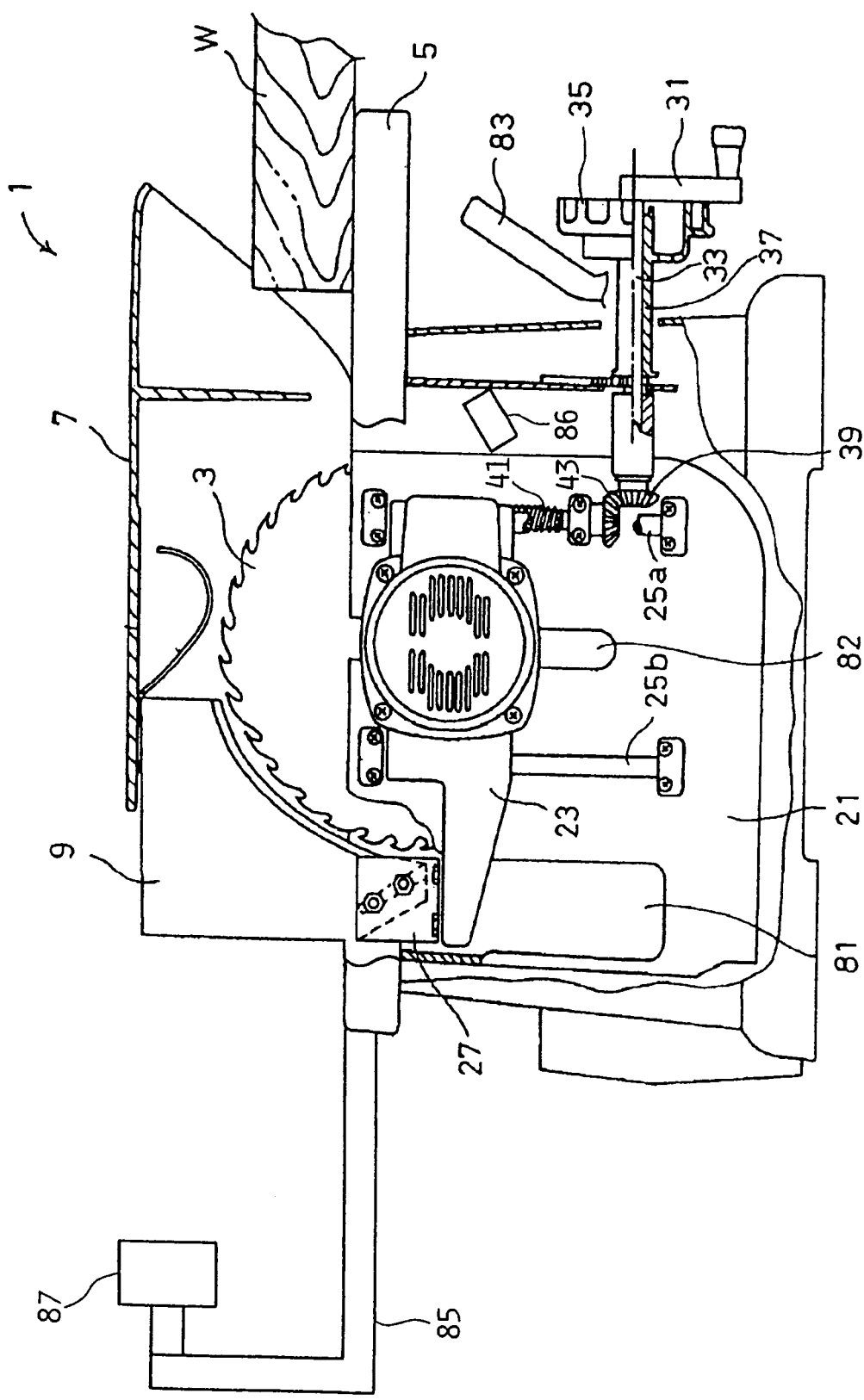
FIG. 1 is a partial cross-sectional side view showing a table saw according to a first representative embodiment of the present teachings.

FIG. 1 shows a first detailed representative embodiment of the present teachings, which is table saw 1 having table 5 on which to position wooden work W. A portion of circular blade 3 protrudes above table 5, and top and sides of this protruding portion are covered by blade guard 7. Blade guard 7 is rotatably attached to table 5 and is pushed open by work W during cutting.

Figure 2:
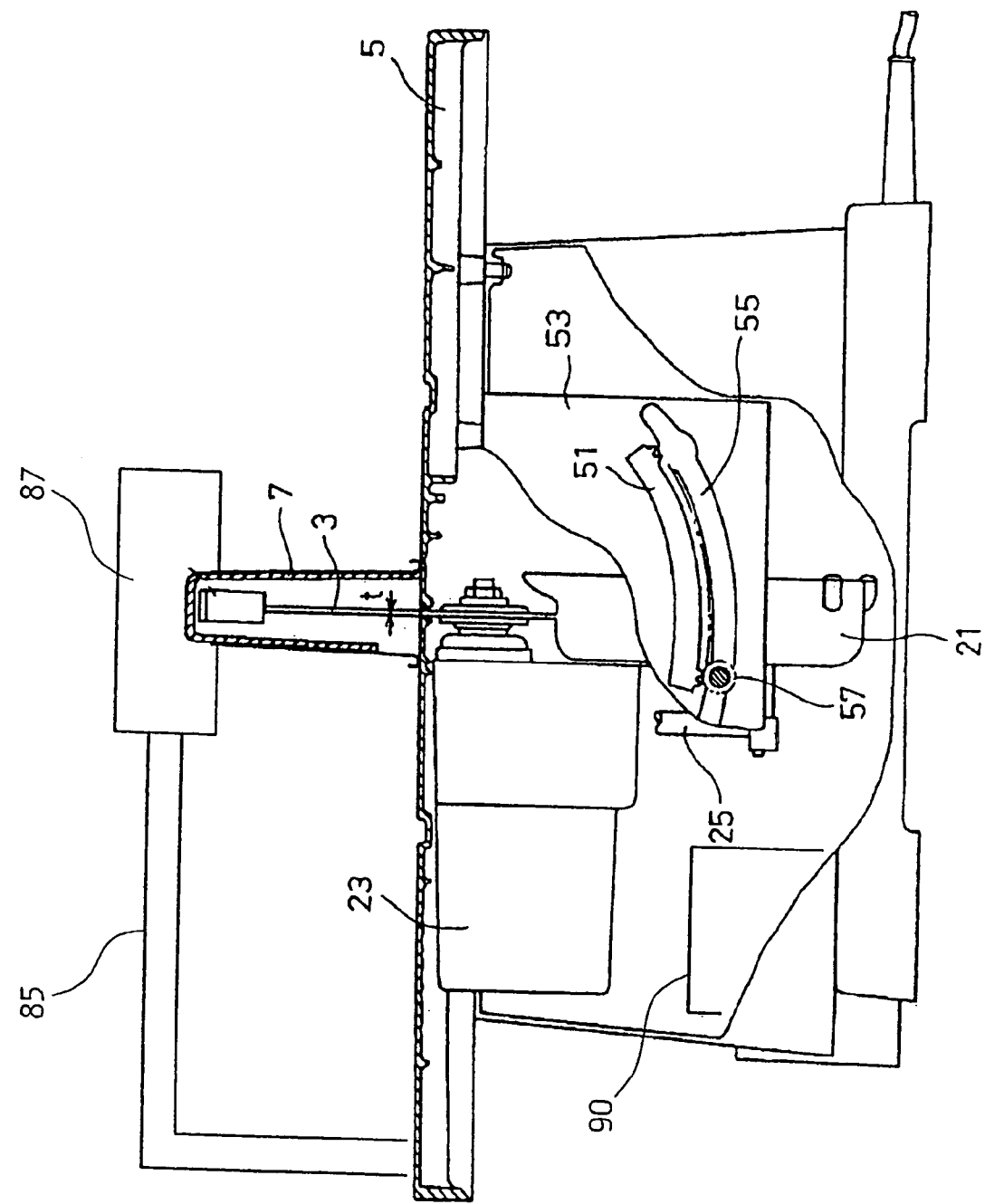
FIG. 2 is a partial cross-sectional plane view of the table saw shown in FIG. 1.

As shown in FIGS. 1 and 2, a lower portion of circular blade 3 may be disposed within blade hood 21 that is attached to table 5 in a manner whereby it can be inclined. Openings 81 and 82 for allowing motor housing 23 to move up and down are formed in a side face of blade hood 21. Motor housing 23 is attached, in a manner whereby up and down movement is possible, to the side face of blade hood 21 via two guide bars 25a and 25b. Motor M is disposed within motor housing 23. Circular blade 3 is attached to a drive shaft of motor M.

As shown in FIG. 1, splitting blade 9 for preventing the closure of the hole cut in the work W by circular blade 3 may be attached at the posterior of circular blade 3. Splitting blade 9 is fixed to a posterior end of motor housing 23 by means of bracket 27 fastened by bolts. Thus, as the height to which circular blade 3 is exposed above table 5 changes as motor housing 23 is moved up and down, splitting blade 9 moves up and down therewith.

Next, the mechanism for moving motor housing 23 up and down will be explained. Motor housing 23 may be moved up and down by means of rotating handle 31 that projects at the anterior of table 5. Shaft 33 of handle 31 is the same axis as shaft 37 of inclining dial 35. Bevel gear 39 is connected to a tip of shaft 33. Bevel gear 43 engages bevel gear 39, bevel gear 43 being connected to a lower end of threaded shaft 41 that extends in a longitudinal direction.

The upper and lower ends of threaded shaft 41 are fixed to blade hood 21, threaded shaft 41 rotating in one spot without moving up or down. A nut member (not shown) having an inner thread is coupled to threaded shaft 41, and the nut member is fixed to motor housing 23. As a result, when handle 31 is rotated, motor housing 23 is moved up or down by means of the thread feed mechanism of threaded shaft 41 and the nut member. Guide bars 25a and 25b function to guide the up-down movement of motor housing 23.

Next, the mechanism for causing circular blade 3 to incline will be explained. Blade hood 21 may be inclined by rotating inclining dial 35 that has the same axis as handle 31. As shown in FIG. 2, plate 53 having arc-shaped gear 51 fixed thereto is attached to an anterior side of table 5. Arc-shaped slit 55 which follows arc-shaped gear 51 is formed in the plate 53. Shaft 33 of handle 31 passes through slit 55 to an inner side. Pinion gear 57 that engages arc-shaped gear 51 is fixed to shaft 37 of inclining dial 35. As a result, when inclining dial 35 is rotated, pinion gear 57 moves along the arc of arc-shaped gear 51, and blade hood 21 inclines therewith. When blade hood 21 has inclined such that circular blade 3 has reached a desired angle, locking lever 83 is operated to fix blade hood 21.

Figure 3:
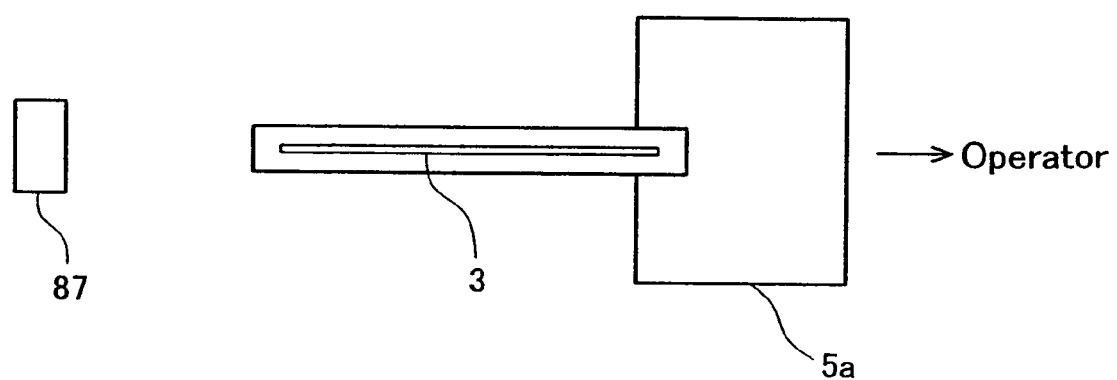
FIG. 3 schematically shows the positional relationship between a circular blade and a penetrable window.

As shown in FIG. 1, first radar device 86 and second radar device 87 may be disposed at the anterior and posterior respectively of circular blade 3. First radar device 86 may monitor a first predetermined area that is in the vicinity of a location where an outer edge of circular blade 3 and work W make contact. As shown in FIG. 1, first radar device 86 is disposed to the anterior of circular blade 3 below table 5. As shown in FIG. 3, table 5 may have penetrable window 5a, through which radio waves penetrate, near the anterior edge of circular blade 3. A plate made from resin may be utilized to form penetrable window 5a.

Second radar device 87 may monitor a second predetermined area that surrounds the portion of circular blade 3 that protrudes above table 5. As shown in FIGS. 1 and 2, second radar device 87 may be attached to the tip of arm 85 attached to the posterior of table 5. As is clear from the figures, second radar device 87 is disposed above and to the posterior of circular blade 3.

Figure 4:
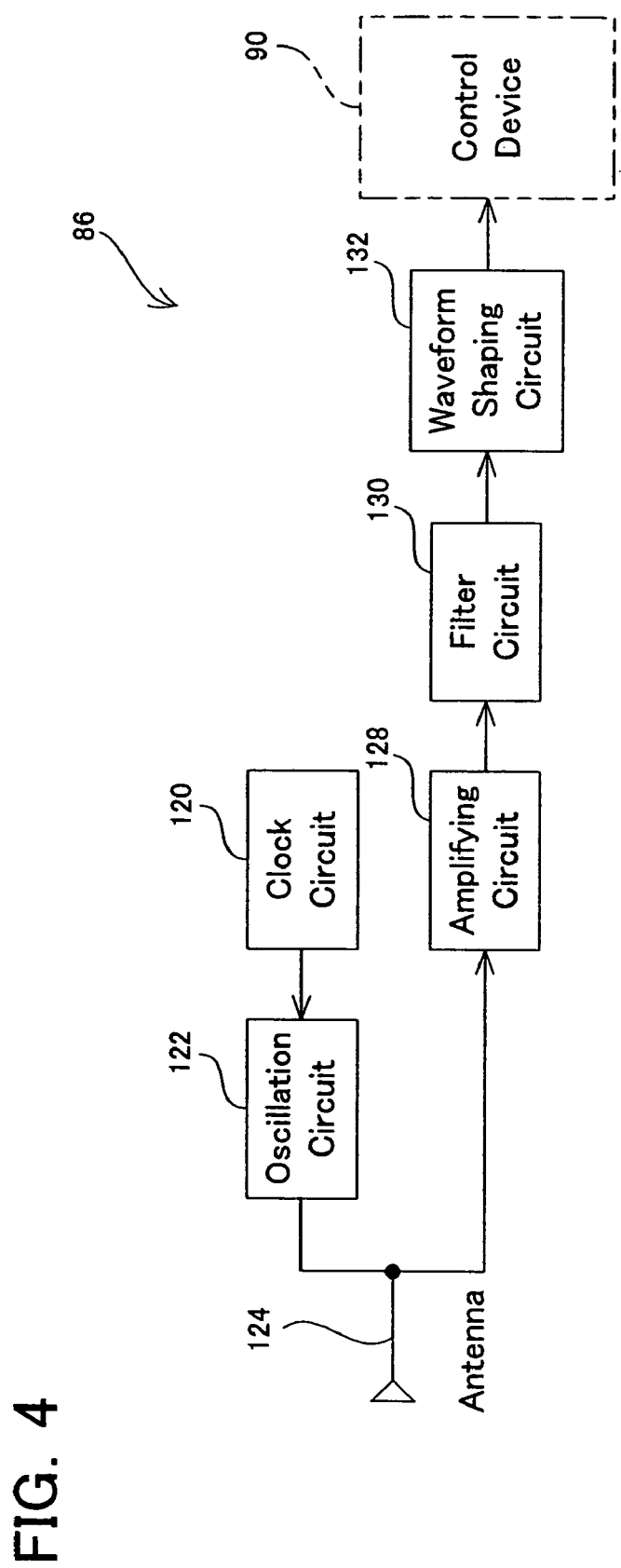
FIG. 4 is a block diagram schematically showing a representative circuit of a first radar device.

Next, first radar device 86 and second radar device 87 will be explained in more detail. First, first radar device 86 will be explained. FIG. 4 is a block diagram showing a representative circuit of the first radar 86. As shown in FIG. 4, first radar device may include antenna 124 for transmitting and receiving radio waves. Oscillation circuit 122 for oscillating an electrical signal at a specified frequency and outputting this electrical signal may be connected to antenna 124 (specifically, to a radio wave transmitting member of antenna 124). Clock circuit 120 may be connected to oscillation circuit 122. Clock circuit 120 is a circuit for periodically causing the output of oscillation circuit 122 to be ON or OFF. Radio waves are transmitted from antenna 124 only while clock circuit 120 causes the output of oscillation circuit 122 to be ON.

Waveform shaping circuit 132 may be connected to antenna 124 (specifically, to a radio wave receiving member of antenna 124) via amplifying circuit 128 and filter circuit 130. Amplifying circuit 128 amplifies the signal of the radio waves received by antenna 124. Filter circuit 130 filters noise from the signal amplified by amplifying circuit 128. Waveform shaping circuit 132 shapes the waveform of the signal that was output from filter circuit 130, then outputs the shaped signal to control device 90.

Preferably, microwaves (i.e., frequency: 3–30 GHz) may be used in the radio waves that are output from first radar device 86; in the first representative embodiment, 10.5 GHz microwaves may be used. The radio wave reflection coefficient of wooden work W and the radio wave reflection coefficient of an object other than work (e.g., a operator's hand or finger, etc.) differ greatly with the radio waves of this frequency band, and this difference in radio wave reflection coefficients is utilized to enable discrimination between work W and objects other than work W. Specifically, with radio waves of this frequency band, the radio wave reflection coefficient is low with wood, which has a low moisture content, and the radio wave reflection coefficient is high with objects having a high moisture content. As a result, in the first representative embodiment, the strength of the peak values of the reflected waves are used to determine whether the reflected waves were reflected from work W or from an object other than work which was located above the work W.

Figure 5A:
FIG. 5A schematically shows a waveform of an output gate signal of the first radar device.
Figure 5B:
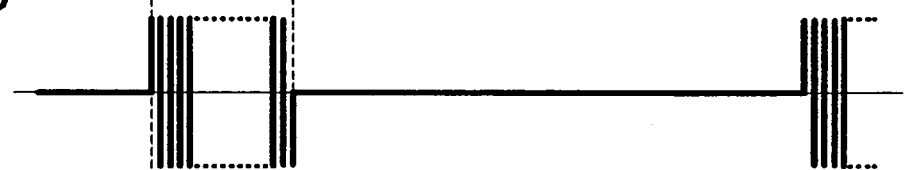
FIG. 5B schematically shows a waveform of output signal from an oscillation circuit of the first radar device.
Figure 5C:
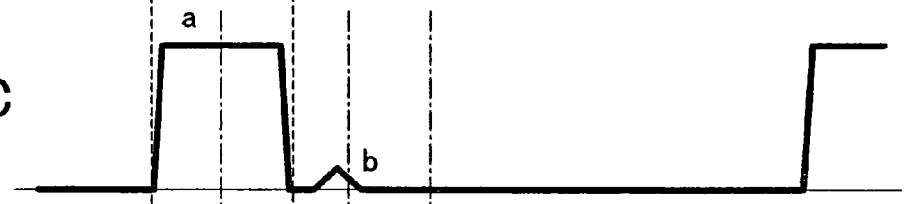
FIG. 5C schematically shows a waveform of a radio wave received by the first radar device when only wooden work is disposed in a first predetermined area.
Figure 5D:
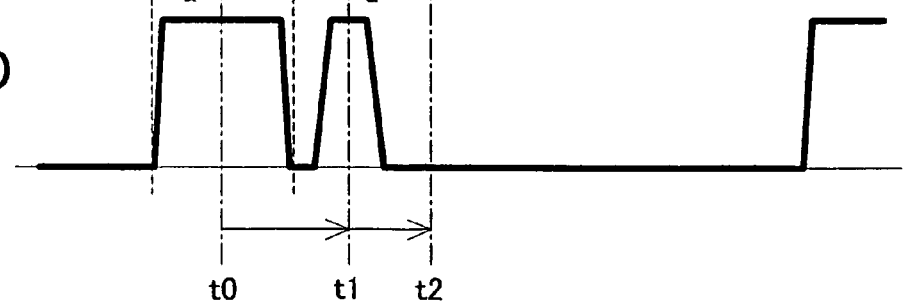
FIG. 5D schematically shows a waveform of a radio wave received by the first radar device when work W and a finger are disposed in the first predetermined area.

FIGS. 5A–5D shows radio waves transmitted from first radar device 86 together with output waveforms of radio waves received by first radar device 86. FIG. 5A shows the waveform of an output gate for outputting the signal of oscillation circuit 122 to antenna 124. FIG. 5B shows the waveform of the signal that is actually being output from oscillation circuit 122 to antenna 124. FIG. 5C shows the output waveform of a radio wave received by first radar device 86 when only wooden work W is located in the first predetermined area. FIG. 5D shows the output waveform of a radio wave received by first radar device 86 when work W and a finger are located in the first predetermined area.

As shown in FIG. 5A, the output gate for outputting the signal of oscillation circuit 122 is ON only for periodic time intervals Tp. As a result, as shown in FIG. 5B, a signal of 10.5 GHz is output from oscillation circuit 122 only while the output gate is ON, radio waves being transmitted from the radio wave transmitting member of antenna 124 on the basis of this output signal. After the radio waves have been transmitted from antenna 124, these transmitted radio waves and the reflected radio waves are received by the radio wave receiving member of antenna 124. In FIGS. 5C and 5D, 'a' are waves that were transmitted from the radio wave transmitting member and received directly by the radio wave receiving member, 'b' and 'd' are reflected waves that were reflected from objects in the first predetermined area. As is clear from the figures, the reflected waves 'b' reflected from work W have a low peak voltage, whereas the reflected waves 'd' that penetrate work W and are reflected from a finger have a high peak voltage. Consequently, it is possible to determine, on the basis of the peak voltages of the reflected waves received by first radar device 86, whether only work W or an object other than work W is in the first predetermined area. Furthermore, the distance between first radar device 86 and objects determines the time taken until the reflected waves are observed (i.e., the period t0–t1 shown in FIG. 5D). Consequently, the time (t0–t2) taken for the reflected waves to be observed by first radar device 86 may be determined by the distance between first radar device 86 and the first predetermined area. As a result, it is acceptable for the time for first radar device 86 to observe the reflected waves to be up until t2.

Figure 6:
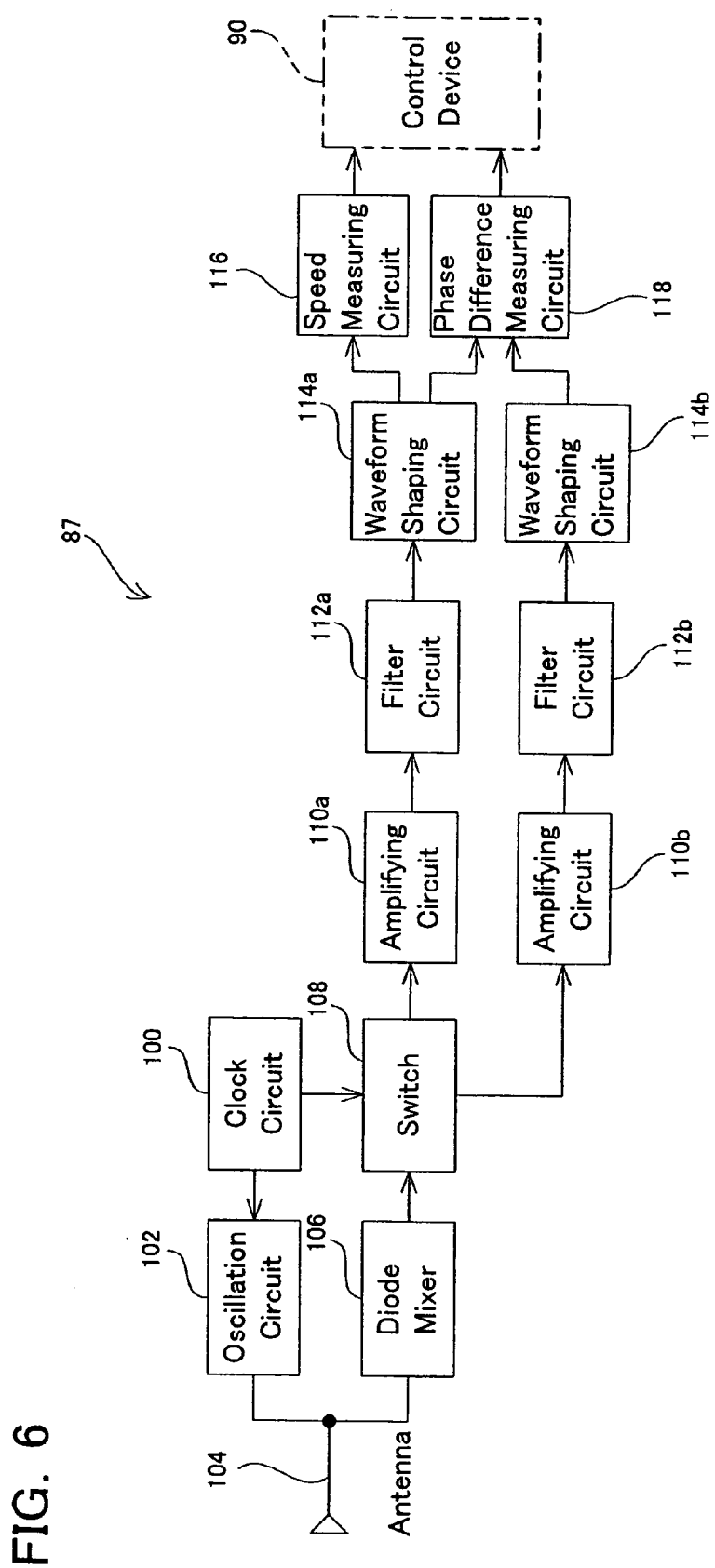
FIG. 6 is a block diagram showing a representative circuit of a second radar device.
Figure 7:
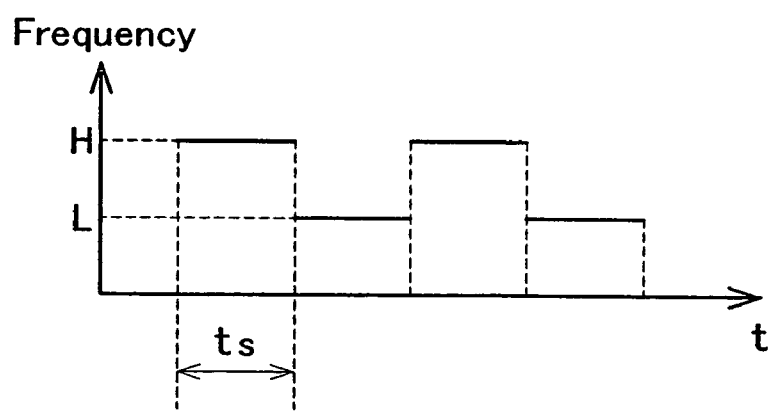
FIG. 7 schematically shows the relationship between frequency and time of radio waves transmitted from the second radar device.

Next, second radar device 87 will be explained. FIG. 6 is a block diagram showing a representative circuit of the second radar 87. As shown in FIG. 6, second radar device 87 may have antenna 104 for transmitting and receiving radio waves. Oscillation circuit 102 is connected to antenna 104 (specifically, to a radio wave transmitting member of antenna 104), and clock circuit 100 is connected to oscillation circuit 102. Clock circuit 100 periodically transfers the frequency of the signal that is output from oscillation circuit 102 to two-phase, and also switches the state of switch 108. As a result, as shown in FIG. 7, the frequency of the signal that is output from oscillation circuit 102 is periodically (1 period=2×ts) switched from a high frequency H to a low frequency L. Further, as the frequency of the signal that is output from oscillation circuit 102 is switched, circuits (110a–114a and 110b–114b) for processing the signal from a radio wave receiving member of antenna 104 is simultaneously switched. Further, as is clear from FIG. 7, second radar device 87 differs from first radar device 86, in that it continuously transmits radio waves at one of the two frequencies.

Moreover, diode mixer 106 is connected to antenna 104 (specifically, to the radio wave receiving member of antenna 104). Diode mixer 106 is a circuit that mixes the radio waves received by antenna 104, that is, the radio waves that are transmitted from the radio wave transmitting member of antenna 104 and the radio waves that have been reflected by a reflector, and outputs these mixed waves (i.e., diode mixer 106 is a so-called waveform inspection circuit). The output from diode mixer 106 changes on the basis of whether or not a reflector is moving towards second radar device 87. That is, if the reflector is not moving, the radio waves reflected by the reflector have the same frequency as the radio waves transmitted by antenna 104. On the other hand, due to the Doppler effect, if the reflector is moving, the radio waves reflected by the reflector have a frequency different from that of the radio waves transmitted by antenna 104. As a result, if the reflector is moving, radio waves having two close but differing frequencies mutually interfere, causing beats to appear in the output waveform of diode mixer 106. In second radar device 87 of the first representative embodiment, the frequency of these beats is used to measure the speed of movement of the reflector. Furthermore, the output from diode mixer 106 also differs from the frequency of the radio waves output from antenna 104. In the second radar device 87 of the first representative embodiment, the phase difference of the beats produced by the two frequencies of the radio waves created by the reflections from the reflector is used to measure the position of the reflector (i.e., the distance from the second radar device 87).

Two circuit groups are connected with diode mixer 106 via switch 108. That is, the first circuit group may comprise amplifying circuit 110a, filter circuit 112a and waveform shaping circuit 114a. The second circuit group may comprise amplifying circuit 110b, filter circuit 112b, and waveform shaping circuit 114b. The first circuit group is connected to diode mixer 106 while antenna 104 is transmitting radio waves at the first frequency, and the second circuit group is connected to diode mixer 106 while antenna 104 is transmitting radio waves at the second frequency. The structure and effects of the circuits is identical with the circuits used in first radar device 86.

The two waveform shaping circuits 114a and 114b are connected to phase difference measuring circuit 118, whereas only waveform shaping circuit 114a is connected to speed measuring circuit 116. Phase difference measuring circuit 118 is a circuit for measuring the phase difference of the beats observed when the radio waves of both frequencies are transmitted (in other words, measuring the distance of the reflector), and speed measuring circuit 116 is a circuit for measuring the phase difference of the beats observed when the radio waves of the first frequency is transmitted (in other words, measuring the speed of the reflector). The output of phase difference measuring circuit 118 and of speed measuring circuit 116 are both output to control device 90.

Figure 8:
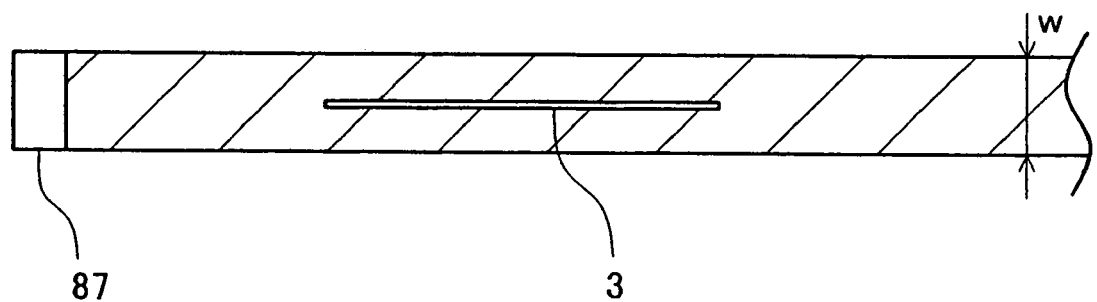
FIG. 8 schematically shows an area monitored by the second radar device.

Preferably, radio waves of 1 GHz or above may be used in the radio waves output from second radar device 87; in the first representative embodiment, 24.2 GHz microwaves may be used. This is because it is preferred that second radar device 87 monitors only the surroundings of circular blade 3. In other words, as shown in FIG. 8, this is because contact with circular blade 3 is unlikely in locations at a distance greater than a predetermined value (w/2 or greater) from side faces of circular blade 3. A further reason for using the above frequency is that the higher the frequency of radio waves the shorter the wavelength, which allows the location and speed of the reflector to be detected accurately. Moreover, the antenna shape and location of second radar device 87 is determined so that the desired directivity (that is, a directivity adequate to observe the second predetermined area) can be obtained when radio waves at the above frequencies are transmitted.

Figure 9:
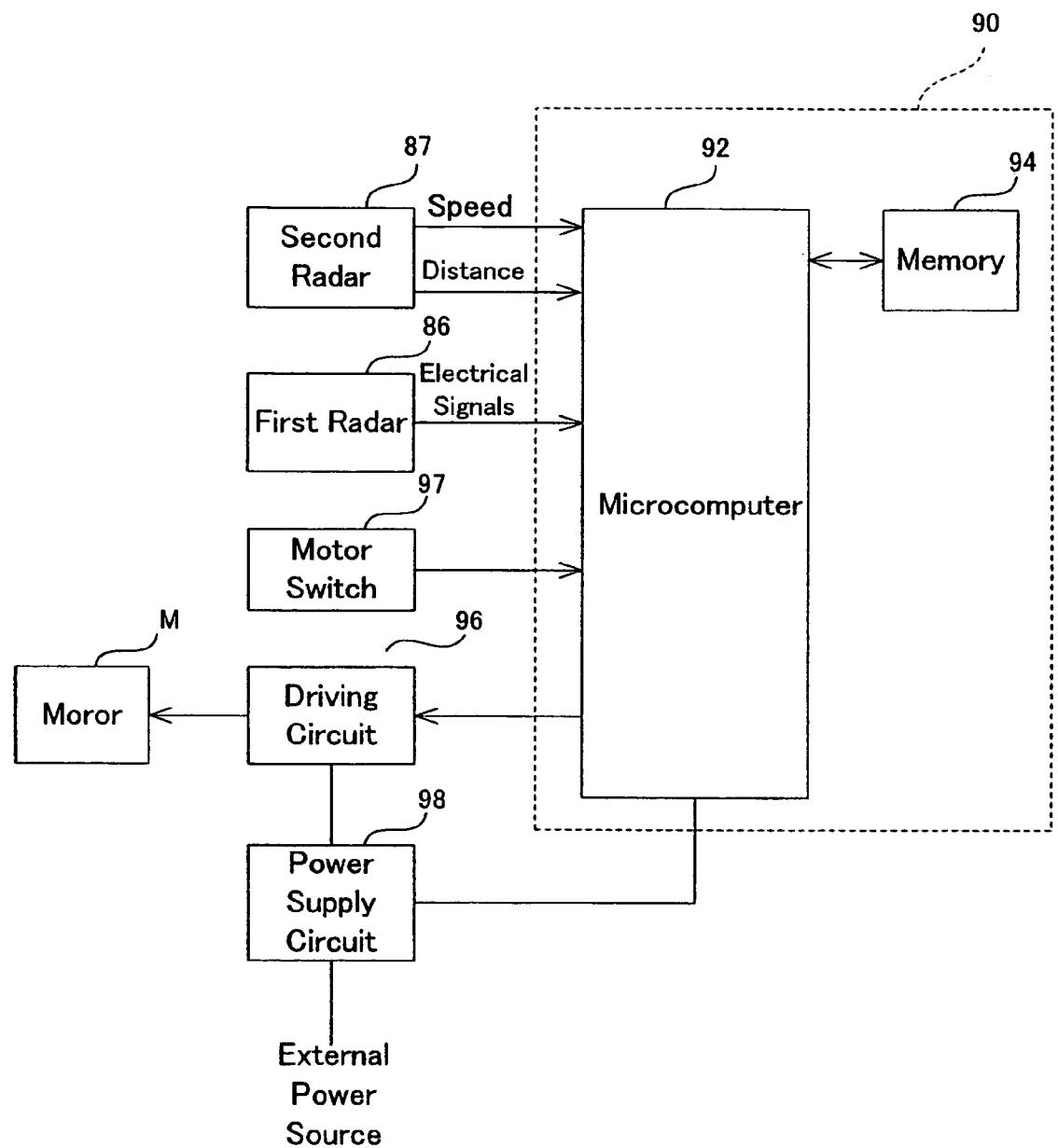
FIG. 9 is a block diagram showing a representative circuit of the table saw of the first embodiment.

A representative circuit diagram for controlling table saw 1 will be explained with reference to FIG. 9. As shown in FIG. 2, control device 90, which disposed below table 5 (see FIG. 2), may include microcomputer 92 and memory 94 (e.g., EEPROM). Microcomputer 92 may preferably include a CPU, ROM, RAM and I/O (interface), which are preferably integrated onto a single integrated circuit chip. The ROM of microcomputer 92 may store programs for automatically stopping the driving operation of motor M. Memory 94 is connected to microcomputer 92 and stores the waveforms observed by first radar device 86 when only work W is located in the first predetermined area near the outer edge of circular blade 3. The reflected waveforms stored in memory 94 change each time the type (e.g., thickness, wood type, etc.) of work W cut by table saw 1 changes.

First radar device 86 and second radar device 87 are connected to microcomputer 92, and the reflected waveforms output from first radar device 86, and the speed and location of the reflector output from second radar device 87 are input to the microcomputer 92. Power supply circuit 98 is connected to motor M via driving circuit 96, and is connected to microcomputer 92. Power supply circuit 98 is capable of being connected to an external commercial power source, and supplies the power supplied from this external commercial power source to microcomputer 92 and motor M. Further, motor switch 97 for starting motor M is connected to microcomputer 92.

Figure 10:
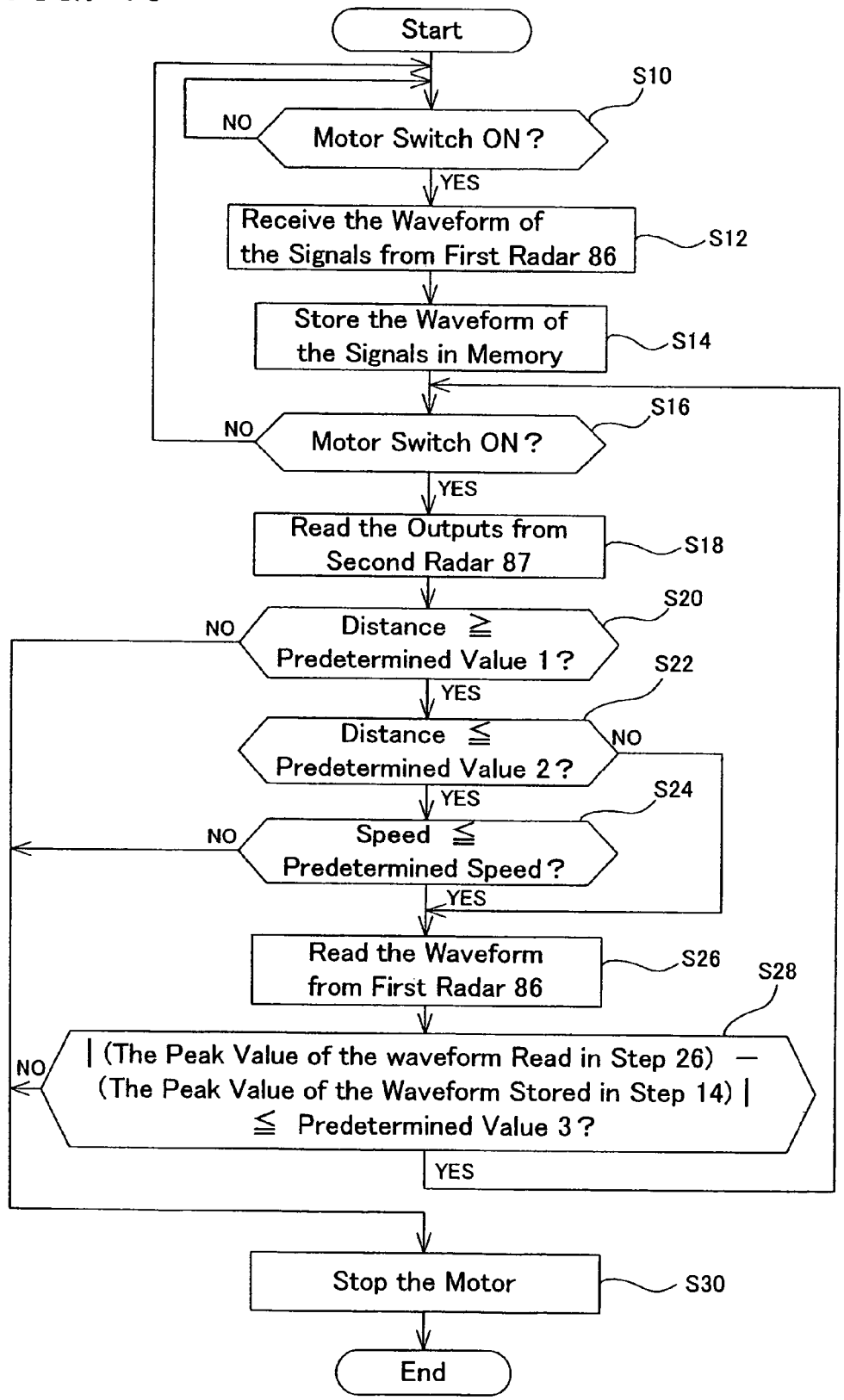
FIG. 10 is a flowchart of a representative process for cutting a work using the table saw.

FIG. 10 shows a representative method for operating microcomputer 92 in order to cut a work using table saw 1. That is, FIG. 10 is a flowchart of the process or program executed by microcomputer 92 during a cutting operation. In order to cut the work using the table saw 1, the operator first turns a power switch ON, power supply to the microcomputer 92 thereby beginning. At this time, motor switch 97 is OFF, consequently circular blade 3 does not begin to rotate.

When the power switch has been turned ON, as shown in FIG. 10, microcomputer 92 waits until motor switch 97 is turned ON (step S10). The operator first positions the work in the first predetermined area (i.e., the anterior of circular blade 3), then turns the motor switch 970N. When motor switch 97 has been turned ON (YES in step S10), microcomputer 92 causes first radar device 86 to operate, and receives the waveforms of the signals that are output from first radar device 86 (step S12). The received waveforms are the reflected waveforms from the radio waves reflected from the work. When the waveforms of the signals output from first radar device 86 have been received, microcomputer 92 stores these received waveforms in memory 94 (step S14).

Further, when motor switch 97 has been turned ON (YES in step S16), microcomputer 92 outputs a ON signal to driving circuit 96, this starting the supply of power to motor M from power circuit 98, and simultaneously causing the operation of first radar device 86 and second radar device 87. As a result, circular blade 3 begins to rotate, and the measured results from first radar device 86 and second radar device 87 are periodically output. Microcomputer 92 first reads in the output (i.e., the speed and location of the object moving within the second predetermined area) from second radar device 87 (step S18).

Then, microcomputer 92 determines whether the distance from second radar device 87 to the object, which was read in in step S18, is equal to or greater than a predetermined value 1 (step S20). This predetermined value 1 is shorter than the distance from second radar device 87 to circular blade 3. If the measured distance is below the predetermined value 1 (NO in step S20), microcomputer 92 quickly stops motor M (step S30). Specifically, microcomputer 92 outputs an OFF signal to driving circuit 96, this cutting off the supply of power to motor M. By this means, the rotation of motor M is halted.

As described above, the driving operation of motor M is halted when the distance measured by second radar device 87 is below the predetermined value 1 (that is, when an object is between second radar device 87 and circular blade 3). Motor M is halted in this manner because objects extremely close to second radar device 87 prevent second radar device 87 from monitoring the surroundings of circular blade 3.

If the measured distance is equal to or greater than the predetermined value 1 (YES in step S20), microcomputer 92 determines whether the distance from second radar device 87 to the object, which was read in in step S18, is equal to or less than a predetermined value 2 (step S22). This predetermined value 2 is greater than the predetermined value 1, and is longer than the distance from second radar device 87 to circular blade 3. If the measured distance exceeds the predetermined value 2 (NO in step S22), the process proceeds to step S26. On the other hand, if the measured distance is equal to or below the predetermined value 2 (YES in step S22), microcomputer 92 determines whether the speed of the object read in in step S18 is equal to or less than a predetermined speed (step S24). If the speed of the object read in in step S18 is equal to or less than the predetermined speed (YES in step S24), the process proceeds to step S26. If the speed of the object read in in step S18 exceeds the predetermined speed (NO in step S24), microcomputer 92 quickly stops motor M (step S30).

Figure 11:
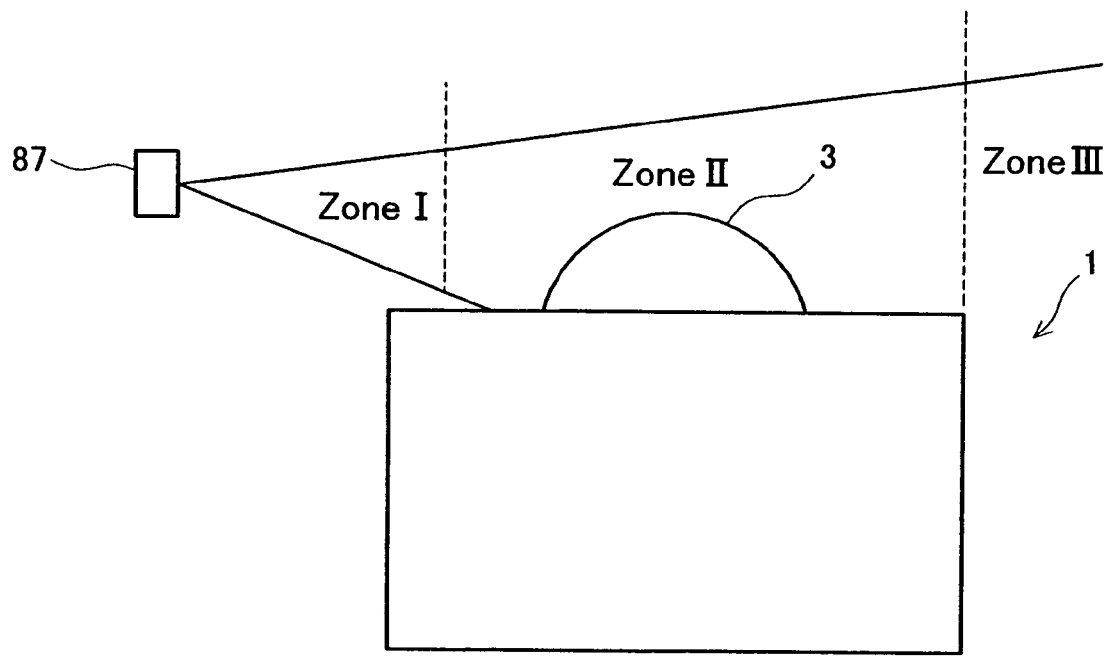
FIG. 11 shows the positional relationship between the circular blade and the area monitored by the second radar device divided into zone I, zone II, and zone III.

Thus, in the case where the object measured by second radar device 87 is within zone I shown in FIG. 11, (that is, in the case where the distance from second radar device 87 is below the predetermined value 1), the driving operation of motor M is halted. In the case where the object measured by second radar device 87 is within zone II (that is, in the case where the distance from second radar device 87 is equal to or above the predetermined value 1 and equal to or less than the predetermined value 2), motor M is halted only when the speed of the object exceeds a predetermined speed. Further, in the case where the object measured by second radar device 87 is within zone III (that is, in the case where the distance from second radar device 87 exceeds the predetermined value 2), motor M is not halted since the likelihood of contact with circular blade 3 is low.

Microcomputer 92 proceeds to step S26 and takes up the output waveforms from first radar device 86. Then, microcomputer 92 determines whether the absolute value of the difference between the peak values of the output waveforms taken up in step S8 (that is, the peak values of the reflected waves reflected from the object in the first predetermined area) and the peak values of the output waveforms stored in memory 94 in step S2 (that is, the peak values of the reflected waves reflected from the work in the first predetermined area) is equal to or below a predetermined value 3 (step S28).

If the absolute value of the difference between the peak values of the two output waveforms is equal to or below the predetermined value 3 (YES in step S28), microcomputer 92 determines that an object other than work is not present in the first predetermined area, and returns to step S16. Consequently, if motor switch 97 is in an ON state (YES in Step S16), the process after step S18 is repeated. As a result, the rotation of circular blade 3 continues while being monitored by first radar device 96 and second radar device 87, and the operator can perform the cutting operation by sending the work from the anterior at a safe speed.

On the other hand, if the absolute value of the difference between the peak values of the two output waveforms exceeds the predetermined value 3 (NO in step S28), microcomputer 92 determines that an object other than work is present in the first predetermined area, and stops the driving operation of motor M (step S30).

In summary, in the table saw of the first representative embodiment, the surroundings of circular blade 3 are monitored by second radar device 87, and the vicinity of the outer edge of circular blade 3 is monitored by first radar device 86, this allowing the possibility of contact between circular blade 3 and an object other than work to be detected before this contact is made, and halting the driving operation of motor M. As a result, it is possible to prevent contact between the object other than work and the rotating circular blade 3.

Moreover, only radio waves of a single frequency are transmitted from first radar device 86 and second radar device 87. Consequently, antennas 124 and 104 for receiving the reflected waves can be compact, and it is possible to simplify, for example, the amplifying circuit for amplifying the received reflected waves.

Moreover, in the table saw of the first representative embodiment, the use of blade guard 7 allows the monitored area near circular blade to be restricted, thus limiting the number of radar devices. In other words, by using blade guard 7, all that is monitored is the movement, in the direction in which work is sent, of objects near the circular blade, and only the area near the outer edge of the circular blade is monitored. As a result, operation becomes safer using by means of both blade guard 7 and first radar device 86 and second radar device 87.

Figure 12A:
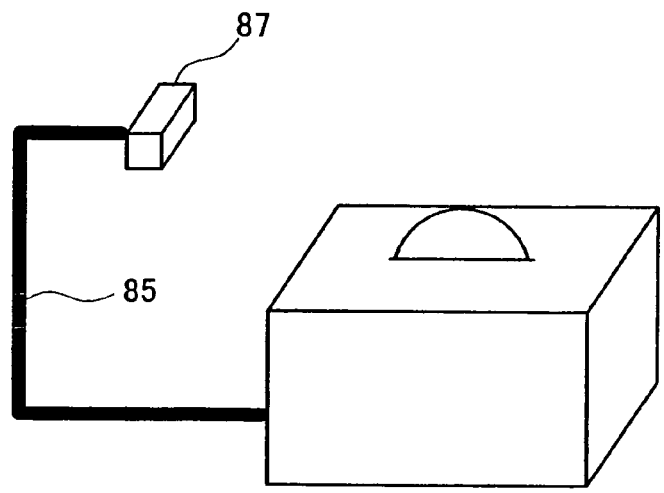
FIG. 12A shows a representative example for disposing the second radar device relative to the table saw of the first representative embodiment.
Figure 12B:
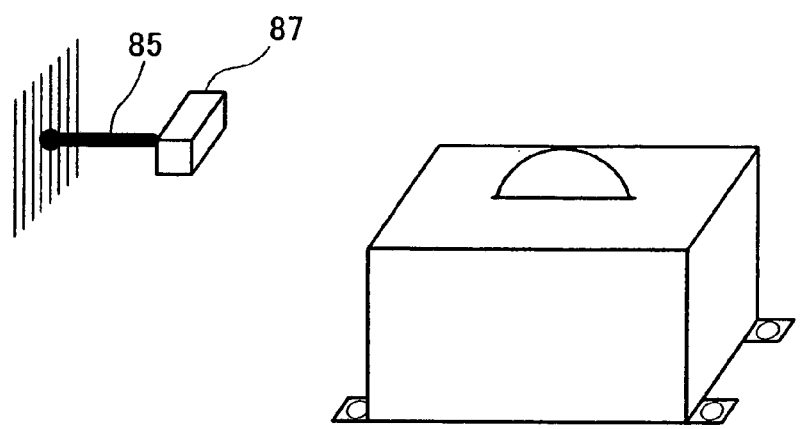
FIG. 12B shows another representative example for disposing the second radar device relative to the table saw of the first representative embodiment.
Figure 12C:
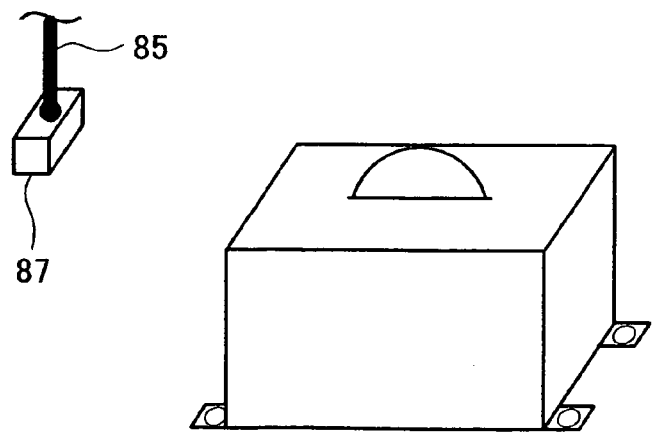
FIG. 12C shows another representative example for disposing the second radar device relative to the table saw of the first representative embodiment.

Further, in the first representative embodiment, second radar device 87 is attached to the tip of the arm attached to table 5. However, second radar device 87 is not restricted to this type of configuration. For example, second radar device 87 may be disposed according to the methods shown in FIGS. 12A–12C. In FIG. 12A, arm 85 is attached to the lower portion of the table saw, second radar device 87 being attached to the tip of arm 85. Further, FIGS. 12B and 12C show cases where the table saw is fixed to a floor. In FIG. 12B, arm 85 is fixed to a wall to the posterior of the table saw and second radar device 87 is attached to the tip of arm 85, and in FIG. 12C, arm 85 is fixed to a ceiling and second radar device 87 is attached to the tip of arm 85.

Further, in the first representative embodiment, motor M immediately halts when the results measured by first radar device 86 and second radar device 87 fulfill predetermined conditions. However, a configuration is also possible wherein decision criteria are set at two stages; first, the operator is warned when the first stage of the decision criteria is exceeded, then the driving operation of the circular blade is halted when the second stage of the decision criteria is exceeded. For example, the region to the anterior of circular blade 3 in zone II of FIG. 11 is divided into a further two regions. If it is determined that an object is anomalously in the region further from circular blade 3, the warning is sounded, and if it is determined that an object is anomalously in the region closer to circular blade 3, an emergency stop of the motor is performed. With this type of configuration, the operator can be alerted by the warning, thus avoiding interruptions to the cutting operation.

Moreover, in the first representative embodiment, single frequency radio waves are transmitted from first radar device 86. However, it is also possible that first radar device 86 transmits radio waves that include all frequencies, such as impulses, and analyzes the frequencies of the reflected waves to more precisely identify objects in the first predetermined area.

Furthermore, in the first representative embodiment, motor M halts when it is determined that there is a likelihood of contact occurring between circular blade 3 and objects other than work. However, it is also possible to provide a retracting mechanism whereby the circular blade is retracted from above to below the table at times of emergency, or to provide a brake mechanism that engages and stop the circular blade at times of emergency.

Second Detailed Representative Embodiment

The table saw of the second representative embodiment has substantially the same configuration as the table saw of the first representative embodiment, differing only in using a microstrip antenna in place of the antenna 104 of second radar device 87 of the first representative embodiment. Consequently, in the following description only the points differing from the first representative embodiment will be explained.

Figure 13A:
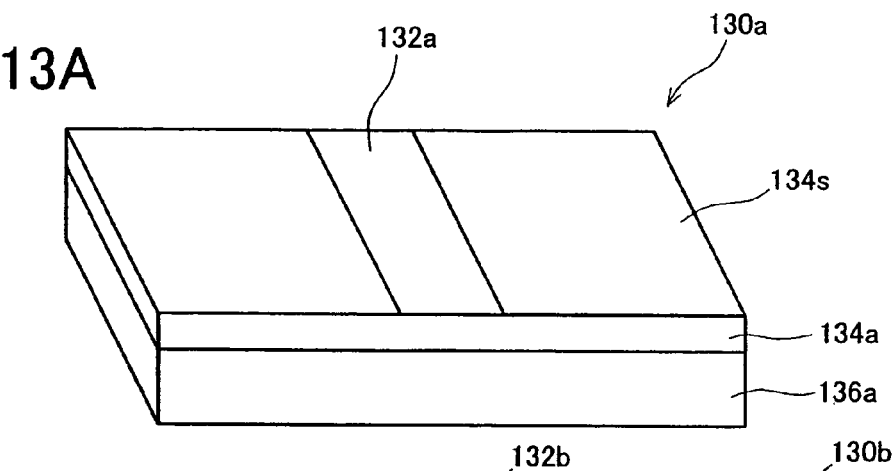
FIG. 13A shows a representative configuration of a microstrip antenna used in a table saw of a second representative embodiment of the present teachings.

First, the configuration of the microstrip antenna will be explained with reference to FIGS. 13A–13G. As shown in FIG. 13A, microstrip antenna 130a may comprise strip line 132a, dielectric substrate 134a, and flat conductor 136a. Flat conductor 136a may have an area greater than strip line 132a. In the case where a body (e.g., a table of a table saw) of a power tool is formed from a conductive material (e.g., a metal plate made from aluminum), the body may be used as the flat conductor 136a. Flat conductor 136a is connected to a ground. Further, flat conductor 136a need not necessarily be flat. Dielectric substrate 134a may be disposed on a surface of flat conductor 136a. Dielectric substrate 134a is a plate-shaped dielectric substance that utilizes, for example, teflon resin, fiberglass epoxy resin, or the like. In particular, in the case where the frequency of radio waves to be transmitted and received is 1 GHz or above, teflon resin is preferably utilized. The thickness of the dielectric substrate 134a may be, for example, up to 1 mm. Strip line 132a may be disposed on a surface 134s of dielectric substrate 134a. Strip line 132a may be formed from a conductive material, such as, for example, copper foil (thickness up to 35 μm). Strip line 132a is connected to a feeder line.

When signals are input to strip line 132a from an oscillation circuit, the voltage between strip line 132a and flat conductor 136a fluctuates. By this means, radio waves are transmitted between strip line 132a and flat conductor 136a. The transmitted radio waves are sent to the surface 134s of dielectric substrate 134a. Thus, microstrip antenna 130a may be disposed on the power tool such that the objects to be measured approach the surface 134s of dielectric substrate 134a. For example, microstrip antenna 130a may be disposed on a surface of the power tool opposite the objects to be measured.

Preferably, the radio waves transmitted from microstrip antenna 130a may be approximately 1 GHz or above. For example, 24.2 GHz microwaves may be used. The reason is that having the radio waves at a higher frequency improves the directivity thereof, allowing the objects to be measured to be detected with greater accuracy. Furthermore, the frequency of the radio waves transmitted from microstrip antenna 130a may be modified so as to be adapted to the properties of the objects to be measured.

In the example shown in FIG. 13A, strip line 132a is copper foil and, due to a surface thereof protruding, may be damaged by abrasion. In this case, it is preferred that microstrip antenna 130a may be disposed within a housing of the power tool. Further, the housing may include a penetrable window through which the radio waves transmitted from microstrip antenna 130a penetrate.

FIGS. 13B–13G show another example of microstrip antennas. The example shown in FIG. 13B utilizes strip conductor 132b in place of strip line 132a in FIG. 13A. Strip conductor 132b may be formed from a conductive material (e.g., a metal plate made from aluminum). The use of strip conductor 132b increases the strength thereof against abrasion or impact. In this case, it is preferred that microstrip antenna 130b may be disposed on the surface of the power tool. Furthermore, microstrip antenna 130b may have a certain degree of thickness (e.g., up to 1 mm). As a result, it is possible to form a groove in dielectric substrate 134b and to dispose strip conductor 132b within this groove. When strip conductor 132b is in a disposed state within the groove, it is preferred that a surface of strip conductor 132b extends along the same plane as a surface of dielectric substrate 134b.

Figure 13B:
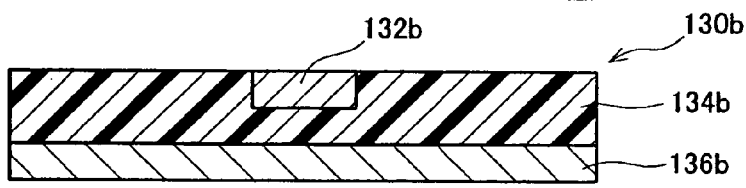
FIG. 13B shows another representative configuration of a microstrip antenna used in the table saw of the second representative embodiment of the present teachings.
Figure 13C:
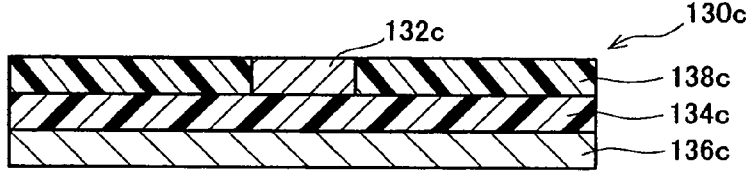
FIG. 13C shows another representative configuration of a microstrip antenna used in the table saw of the second representative embodiment of the present teachings.

In the example shown in FIG. 13C, dielectric substrate 134c does not have a thickness sufficient to provide a groove therein. Consequently, the portions of dielectric substrate 134c not having strip conductor 132c disposed thereon may have a filling material 138c disposed thereon. Filling material 138c allows a surface of strip conductor 132c and a surface of Filling material 138c to extend along one plane. Filling material 138c may be preferably an insulating material, and a material with little dielectric loss. Filling material 138c may be formed from, for example, resin, cement, or the like.

Figure 13D:
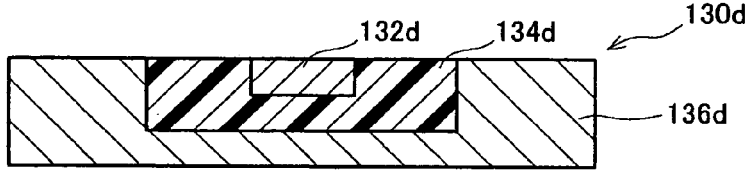
FIG. 13D shows another representative configuration of a microstrip antenna used in the table saw of the second representative embodiment of the present teachings.
Figure 13E:
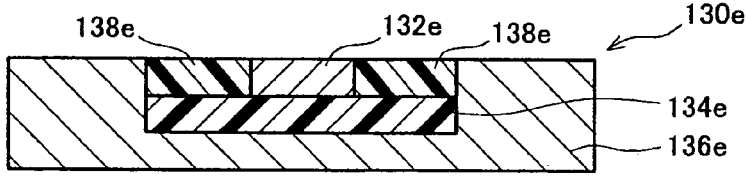
FIG. 13E shows another representative configuration of a microstrip antenna used in the table saw of the second representative embodiment of the present teachings.

Further, in cases where it is not desirable to provide a width like that of dielectric substrate 134b in the example shown in FIG. 13B, or a width like that of filling member 138c in the example shown in FIG. 13C, configurations like those shown in FIGS. 13D and 13E are also possible. That is, in the example shown in FIG. 13D, a groove may be formed in flat conductor 136d, and dielectric substrate 134d and strip conductor 132d may be disposed within the groove. By this means, the area of a surface of dielectric substrate 134d can be reduced. Similarly, in the example shown in FIG. 13E, flat conductor 136e may have a groove, dielectric substrate 134e and strip conductor 132e may be disposed within the groove, and remaining portions may be filled with filling material 138e.

Figure 13F:
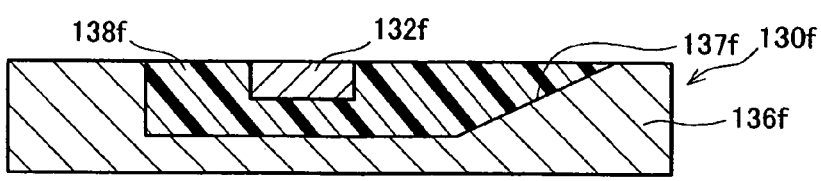
FIG. 13F shows another representative configuration of a microstrip antenna used in the table saw of the second representative embodiment of the present teachings.
Figure 13G:
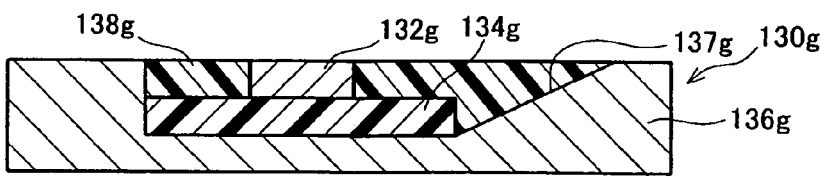
FIG. 13G shows another representative configuration of a microstrip antenna used in the table saw of the second representative embodiment of the present teachings.

Moreover, the configurations shown in FIGS. 13F and 13G are also possible. In the examples shown in FIGS. 13F and 13G, side walls of flat conductors 136f and 136g are inclined faces 137f and 137g. In this case, the radio waves that are transmitted are easily delivered at the side with inclined faces 137f and 137g, and a desirable electromagnetic field (i.e., detecting area) can be formed.

Figure 14:
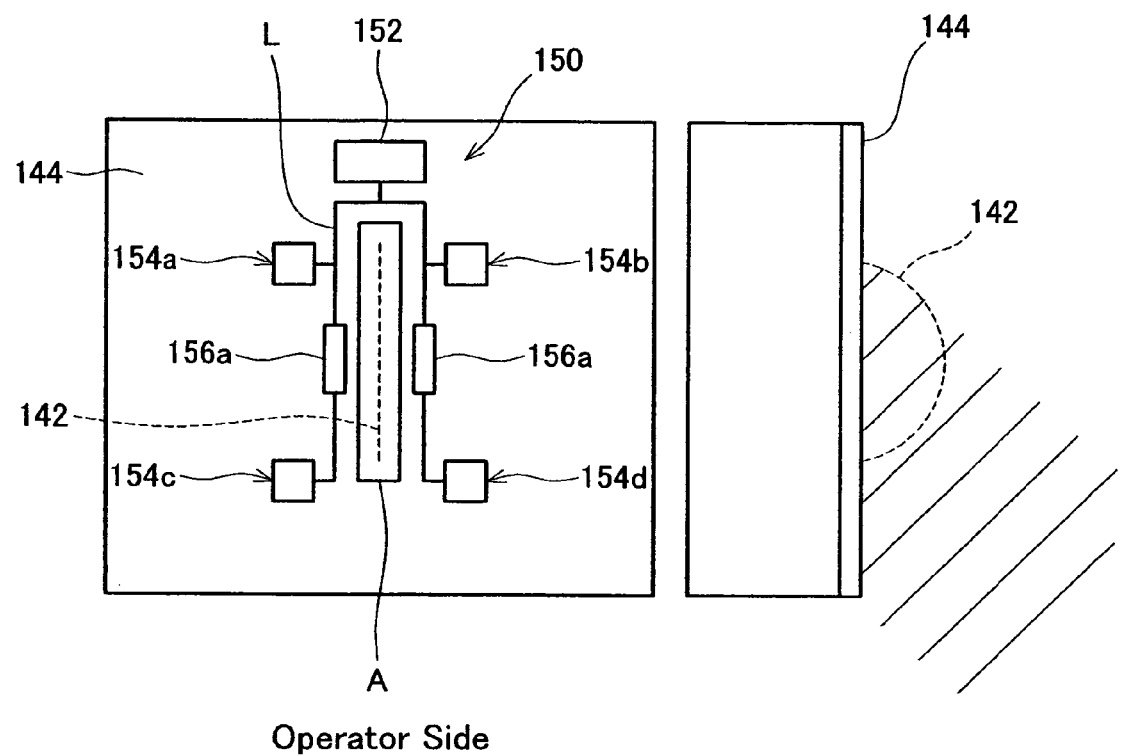
FIG. 14 schematically shows plane and side views of the table saw of the second representative embodiment.

The microstrip antennas configured as described above may be disposed in a table surface of the table saw. FIG. 14 shows an example of an arrangement wherein a microstrip antenna is disposed in a surface of table 144. Located in the surface of table 144 shown in FIG. 14 are: a transmitting and receiving device 152 for transmitting and receiving radio waves; and a plurality of microstrip antennas or patch antennas 154a–154d (hereafter referred to simply as patch antennas). Transmitting and receiving device 152 fulfils the functions of the circuits 100, 102, 106, 108, 110a, 110b, 112a, 112b, 114a, 114b, 116, and 118 shown in FIG. 6. Transmitting and receiving device 152 may be disposed to the posterior (i.e., the direction opposite the operator side) of circular blade 142. Patch antennas 154a–154d are a type of microstrip antenna and fulfill the functions of antenna 104 shown in FIG. 6. Two each of the patch antennas 154a –154d may be disposed on left and right sides of circular blade 142, being separated from one another in an anterior-posterior direction.

Figure 15:
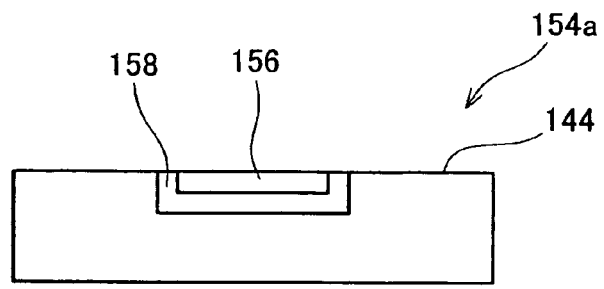
FIG. 15 is a cross-sectional view of an antenna member disposed within a table of the table saw shown in FIG. 14.

FIG. 15 is a cross-sectional view of patch antenna 154a. As shown in FIG. 15, patch antenna 154a comprises strip or patch 156 (hereafter referred to simply as patch), dielectric substrate 158, and table 144. That is, patch 156 corresponds to the strip conductor of FIGS. 13A–13G dielectric substrate 158 corresponds to the dielectric substrate of FIGS. 13A–13G, and table 144 corresponds to the flat conductor of FIGS. 13A–13G.

A groove is formed in table 144, and dielectric substrate 158 is disposed within this groove. Further, a groove is formed in dielectric substrate 158, and patch 156 is disposed within this groove. As is clear from FIG. 15, surfaces of table 144, dielectric substrate 158, and patch 156 all extend along one plane. As a result, patch 156 or dielectric substrate 158 do not form an obstruction when the work is slid across the table 144. Moreover, by being disposed within table 144, patch antenna 154a does not obstruct a design where mechanisms are disposed beneath table 144 (e.g., a inclining mechanism for inclining circular blade 142, etc.). Further, remaining patch antennas 154b, 154c, and 154d may have the same configuration as patch antenna 154a described above.

As shown in FIG. 14, transmitting and receiving device 152 and patch antennas 154a –154d are connected with a feeder line L. Feeder line L may include two phase shifters 156a. That is, one of phase shifters 156a is disposed between patch antenna 154a and patch antenna 154c, and other phase shifter 156a is disposed between patch antenna 154b and patch antenna 154d. By this means, as shown in the figure on the right in FIG. 14, the transmitting and receiving direction of the radio waves of patch antennas 154a –154d is altered towards the operator. As a result, radar device 150 can monitor objects to be measured that move in the area surrounding circular blade 142 protruding above table 144 (particularly the area towards the operator). Furthermore, the dimensions, number, location, etc. of patch antennas 154a –154d may be adapted to correspond to the characteristics of the objects to be measured.

As is clear from the above description, using the microstrip antenna allows the antenna to be miniaturized, and allows the antenna to be disposed in the surface of the power tool. By this means, a greater degree of design freedom can be obtained concerning the location of the antenna.

Figure 16:
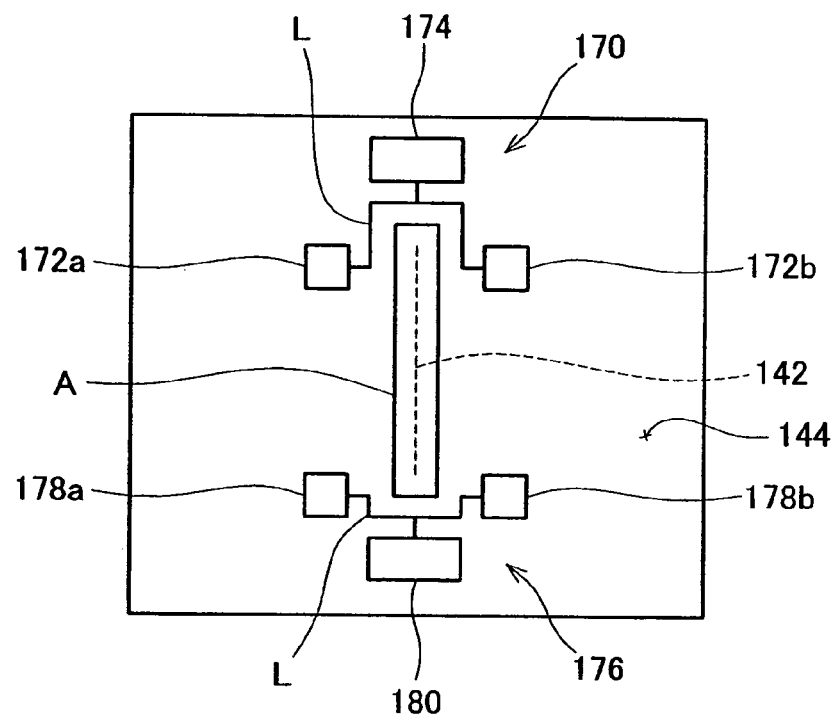
FIG. 16 schematically shows a representative example of an arrangement of patch antennas disposed within the table.

The second representative embodiment described above can be embodied with a variety of transformations or improvements thereto. For example, in the example shown in FIG. 16, transmitting device 170 is disposed to the posterior of circular blade 142 and receiving device 176 is disposed to the anterior of circular blade 142. Transmitting device 170 may include transmitting machine 174 and patch antennas 172a and 172b, these being connected via a feeder line L. Further, receiving device 176 may include receiving machine 180 and patch antennas 178a and 178b, these being connected via a feeder line L. This type of configuration allows the detection of objects to be measured between transmitting device 170 and receiving device 176 (that is, in the vicinity of circular blade 142).

Figure 17:
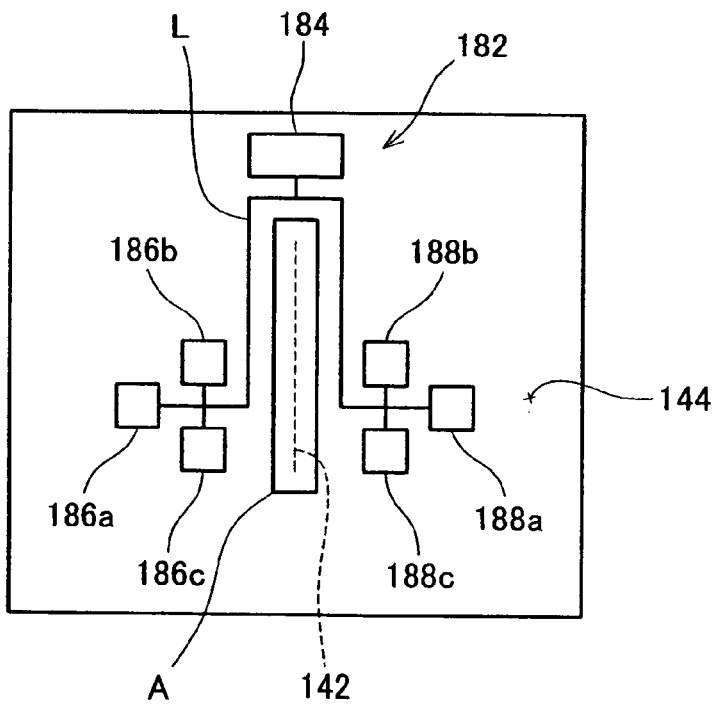
FIG. 17 schematically shows another representative example of an arrangement of patch antennas disposed within the table.

Further, as shown in FIG. 17, it is also possible to locate transmitting and receiving device 184 to the posterior of circular blade 142, and to locate patch antennas 186a –186c, and 188a –188c to the left and right sides respectively of circular blade 142. In other words, the location, number, etc. of the patch antennas can be varied. Moreover, in the second representative embodiment, the microstrip antenna is used in the antenna of a radar device (corresponding to second radar device 87 of the first representative embodiment) that detects the objects to be measured by means of Doppler radar. However, the microstrip antenna may be used in a different type of radar (for example, first radar device 86 in the first representative embodiment).

Although the first and the second representative embodiment have been described in terms of a table saw, the present teachings can naturally be applied to other power tools, such as a miter saw, a slide-type table saw, a slide-type circular saw, etc.

Further, a detecting device which performs radio wave sensing by means of a microstrip antenna have been described in detail above. However, this type of detecting device can also be applied to the power tools described below.

The detecting device described above can also be applied to a demolition hammer. During operation, the vibration of a demolition hammer causes the vibration of not only the tool, but also of the operator's body. In particular, if the vibration is great, the head of the operator is also caused to vibrate. On the other hand, the force with which the hammer strikes the work can be reduced, thereby decreasing the vibration transmitted to the operator; however, in this case, operating efficiency falls as the force with which the hammer strikes the work is reduced. To deal with this problem, the vibration, etc. being transmitted to the operator's head can be detected by means of the detecting device, and a structure can be formed for canceling the vibration. Specifically, the demolition hammer may include a counter-balance and a canceling mechanism for canceling the vibration transmitted to the operator via the counter-balance. The demolition hammer may further include the detecting device which, by means of transmitting radio waves towards the operator, detects the movement of the operator relative to the hammer. Doppler radar, for example, can be used as the radio wave sensing method. Further, an antenna (e.g., a microstrip antenna) of the detecting device can be disposed in a location from where the radio waves can be transmitted towards the operator. For example, the antenna may be disposed within an upper face of a housing. The demolition hammer may further include a control device that can control the canceling mechanism in response to the vibration of the operator's head, the vibration having been detected by the detecting device. Moreover, a pick up may be disposed separately within the housing, measured values from this pick up and the detected values from the detecting device being compared, and the counter-balance being adjusted appropriately.

The detecting device described above can be applied to a jig saw. The jig saw cuts wood by pressing the wood against an inner face of a shoe and moving the jig saw while the wood is in this state. The cutting load varies according to the moisture content and thickness of the wood. Accordingly, the moisture content and thickness of the wood can be detected by means of the detecting device and the detected values used as feedback for the rotation speed of a motor, thereby improving cutting operation. Specifically, a microstrip antenna may be disposed within the inner face (preferably, in a cutting direction viewed from saw blade) of the shoe. The method of radio wave sensing may be, for example, a pulse method whereby radio waves are transmitted in pulses, and the reflected waves therefrom are received. A control device may determine the moisture content or the thickness of the work on the basis of peak values of the reflected waves received by the microstrip antenna. The control device then controls the rotation speed of the motor in accordance with this moisture content and thickness. Furthermore, the moisture content and thickness may be displayed to the operator by means of an indicator or the like. Further, in the case where the saw blade is on the point of cutting the support for the work, or foreign materials such as nails etc. are discovered, a warning may be given and the motor halted.

The detecting device described above can be utilized for preventing the theft of power tools (e.g., a compressor). That is, a microstrip antenna can be disposed within an upper face of a housing of the compressor. Doppler radar, for example, can be used as the method of radio wave sensing. Power for the microstrip antenna can be supplied from a battery that can be removably attached to the compressor. If a person approaches the compressor, or tries to move the compressor, this is detected by the microstrip antenna, an alarm is sounded, and the compressor is disabled. By this means, the theft of the compressor can be prevented. On the other hand, the owner of the compressor carries a transmitter. When the compressor receives radio waves transmitted from this transmitter, the alarm is not sounded, and the compressor is not disabled.

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

The invention claimed is:

1. A power tool, comprising:
    a cutting tool;
    a motor that drives the cutting tool;
    a radar that transmits radio waves towards a predetermined area in the vicinity of a contacting location, the predetermined location being a location where a blade edge of the cutting tool and a work piece make contact, the radar also receiving radio waves reflected therefrom; and
    a processor in communication with the radar, wherein the processor determines whether an object other than work is in the predetermined area based upon the reflected waves received by the radar.

2. A power tool as in claim 1, wherein the processor stops the motor when the processor determines that an object other than work piece is in the predetermined area.

3. A power tool as in claim 2, further comprising a memory, wherein the memory stores the reflected radio waves created when the work piece is located within the predetermined area, the processor determining whether an object other than work piece is in the predetermined area by using the reflected waves received by the radar and the reflected radio waves stored in the memory.

4. A power tool as in claim 3, wherein the processor determines the presence of an object other than the work piece in the predetermined area when the absolute value of the difference between the peak values of voltages of the reflected waves received by the radar and peak values of voltages of the reflected radio waves stored in the memory exceeds a predetermined threshold value.

5. A power tool as in claim 4, wherein the work piece is wooden material and wherein the frequency of the radio waves transmitted from the radar is within the range of 1–30 GHz.

6. A power tool as in claim 5, further comprising a table, wherein a portion of the cutting tool protrudes above the table, wherein the cutting tool cuts the work piece that is placed on an upper face of the table.

7. A power tool as in claim 6, wherein the radar is disposed beneath the table, wherein the table comprises a penetrable window, the penetrable window allowing the radio waves transmitted from the radar to penetrate therethrough.

* * * * *